United States Patent [19]
Herbst

[11] 4,200,808
[45] Apr. 29, 1980

[54] CONTINUOUSLY TUNABLE WIDEBAND COHERENT INFRARED SOURCE

[75] Inventor: Richard L. Herbst, Menlo Park, Calif.

[73] Assignee: Quanta-Ray, Inc., Mountain View, Calif.

[21] Appl. No.: 873,205

[22] Filed: Jan. 30, 1978

[51] Int. Cl.$^2$ .............................................. H03F 7/04
[52] U.S. Cl. ................................................. 307/425
[58] Field of Search ..................................... 302/88.3

[56] References Cited

U.S. PATENT DOCUMENTS 4,011,462  3/1977  Piltch et al. ..................... 307/88.3

Primary Examiner—Rudolph V. Rolinec
Assistant Examiner—Darwin R. Hostetter
Attorney, Agent, or Firm—Harry E. Aine; Harvey G. Lowhurst

[57] ABSTRACT

Output coherent infrared radiation is obtained in a continuously tunable band from 1.4 microns to 25 microns and longer wavelengths. The 1.06 micron output of a Nd:YAG laser, or a harmonic thereof, is difference mixed in a nonlinear crystal, as of LiIO$_3$ or LiNbO$_3$ with a synchronously pumped output of a tunable dye laser oscillator to produce a first tunable output over the range of 0.7 micron to 5.0 microns. The output of the crystal mixer is amplified or difference mixed in a second nonlinear crystal mixer with the 1.06 pump output to produce an output tunable over the range of 1.4 microns to 25 microns and longer wavelengths. Suitable second crystal mixers comprise LiNbO$_3$ for the range of 1.4 to 4.4 microns and operable as an amplifier in the range of 1.4 microns to 2.1 microns, and as a difference mixer in the range of 2.1 to 4.4 microns, AgGaS$_2$ in the range of 4 microns to 12 microns and operating as a difference mixer, and CdSe operating as a difference mixer for the range of 12 microns to 25 microns.

7 Claims, 2 Drawing Figures

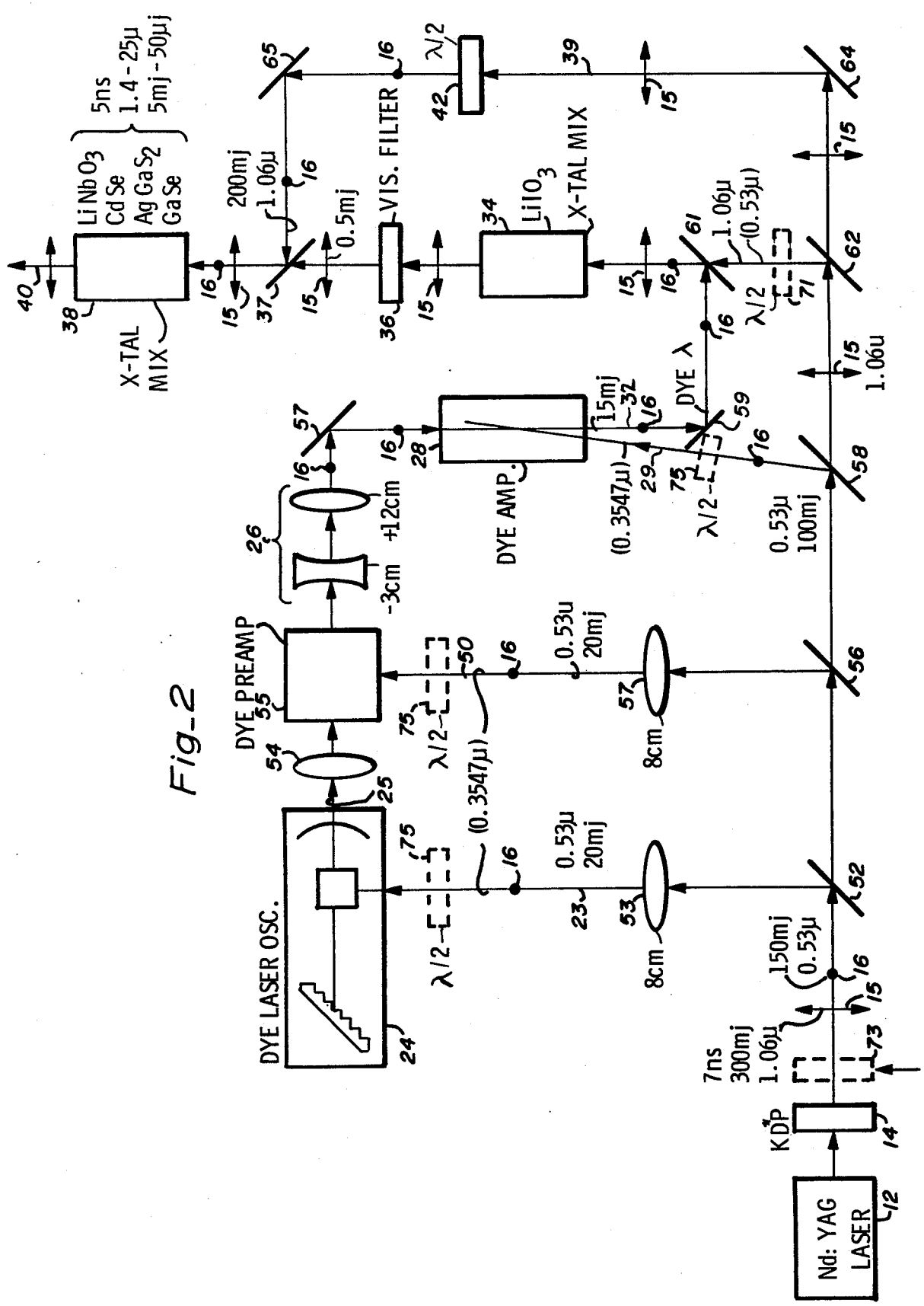
Fig_2

CONTINUOUSLY TUNABLE WIDEBAND COHERENT INFRARED SOURCE

BACKGROUND OF THE INVENTION

The present invention relates in general to a continuously tunable coherent wideband infrared source and, more particularly, to such a source which is continuously tunable over the range of 1.4 to 25 microns.

DESCRIPTION OF THE PRIOR ART

Heretofore, it has been proposed to generate continuously tunable coherent infrared radiation over the range of 1.6 to 25 microns. In this prior proposed system, a Nd:YAG (neodymium yttrium aluminum garnet) laser operating as an optical pump at a fixed wavelength of 1.06 microns was utilized to pump a parametric oscillator of proustite or LiNbO$_3$, for providing a tunable output over the limited range of 1.6 to 3.2 microns. The output of the parametric oscillator was thence down converted by means of difference mixing in a crystal mixer of proustite to cover the range of 3 to 12 microns. By substituting a CdSe crystal mixer for the proustite and operating in the difference frequency mode it was proposed to generate an output between 9.4 and 24.3 microns.

Such a prior art tunable infrared source is disclosed in an article titled "A CdSe Down-Converter Tuned from 9.5 to 24 microns" appearing in Applied Physics Letters, Volume 25, pages 142 et seq. (1974). I have found that the problem with the use of a parametric oscillator followed by difference mixing in a crystal to produce infrared radiation is that the parametric oscillator must be pumped with a relatively high power density, i.e., on the order of tens of megawatts per square centimeter. This very high power density within the parametric oscillator serves to deleteriously affect its operating life and reliability. As a consequence, continuously tunable infrared sources of the type employing a parametric oscillator followed by a stage of crystal mixing is generally unsatisfactory due to its relatively low reliability.

It is also known from the prior art to employ a Nd:YAG laser pump followed by a crystal frequency doubler for generating both 1.06 micron pumping energy and the second harmonic at 0.532 microns and to utilize the 0.532 micron output for pumping a dye laser oscillator for producing a continuously tunable output over the range of 0.549 to 0.727 microns. The tunable output of the dye laser was then sum and difference mixed in a LiIO$_3$ crystal with the laser output at 1.064 microns and 0.532 microns to obtain a tunable output, this output was tunable from 1.1 to 2.3 microns utilizing difference mixing in the LiIO$_3$ crystal with the 1.064 micron pump and was tunable from 1.98 to 5.6 microns utilizing difference mixing with the 0.532 micron output of the laser in the LiIO$_3$ crystal. As a result, continuously tunable coherent infrared radiation was obtained over the range of 1.13 to 5.6 microns. It was also proposed to extend the tunable range to 13 microns by difference mixing the outputs of two dye lasers in a nonlinear crystal of proustite or silver thiogallate and that the range could be extended into the far infrared by crystal mixing in lithium niobate (LiNbO$_3$).

Such nonlinear mixing systems employing the output of a Nd:YAG laser and a mode locked dye laser are disclosed in an article appearing in Optics Communications, Volume 16, #1 of January 1976, pages 21-25. While such a system utilizing a Nd:YAG pumped dye laser followed by nonlinear mixing in a crystal is useful for generating tunable coherent infrared radiation in the range of 1.13 to 5.6 microns, the systems suggested for expanding the tunable range to 13 microns and longer wavelengths utilizing two pumped dye lasers substantially increases the complexity of the coherent tunable infrared source.

Thus, it is desirable to provide an improved coherent infrared source tunable over the range of 1.4 to 25 microns which will have improved reliability as compared to the system employing a Nd:YAG laser pumped parametric oscillator and which will be substantially less complex than the system proposed utilizing a pair of Nd:YAG pumped dye lasers followed by a stage of nonlinear crystal mixing.

SUMMARY OF THE PRESENT INVENTION

The principal object of the present invention is the provision of an improved continuously tunable wideband coherent infrared source.

In one feature of the present invention, the output, or harmonics, of a high power solid state laser is utilized for pumping a continuously tunable dye laser the output of which is cascaded in at least two serial stages of nonlinear crystals for mixing with the output of the solid state lasers or harmonics thereof to generate a continuously tunable infrared output tunable over a very wide range, such as from 1.4 to 25 microns, and longer wavelengths, as desired.

In another feature of the present invention, the second crystal mixing stage utilizes a crystal mixer selected from the group consisting of AgGaS$_2$, CdSe, GaSe, and LiNbO$_3$.

Other features and advantages of the present invention will become apparent upon a perusal of the following specification taken in connection with the accompanying drawings wherein:

BRIEF DESCRIPTION OF THE DRAWINGS

FIG. 2 is a diagram of the same type as FIG. 1 depicting an alternative embodiment of the present invention.

DESCRIPTION OF THE PREFERRED EMBODIMENTS

Figure 1:
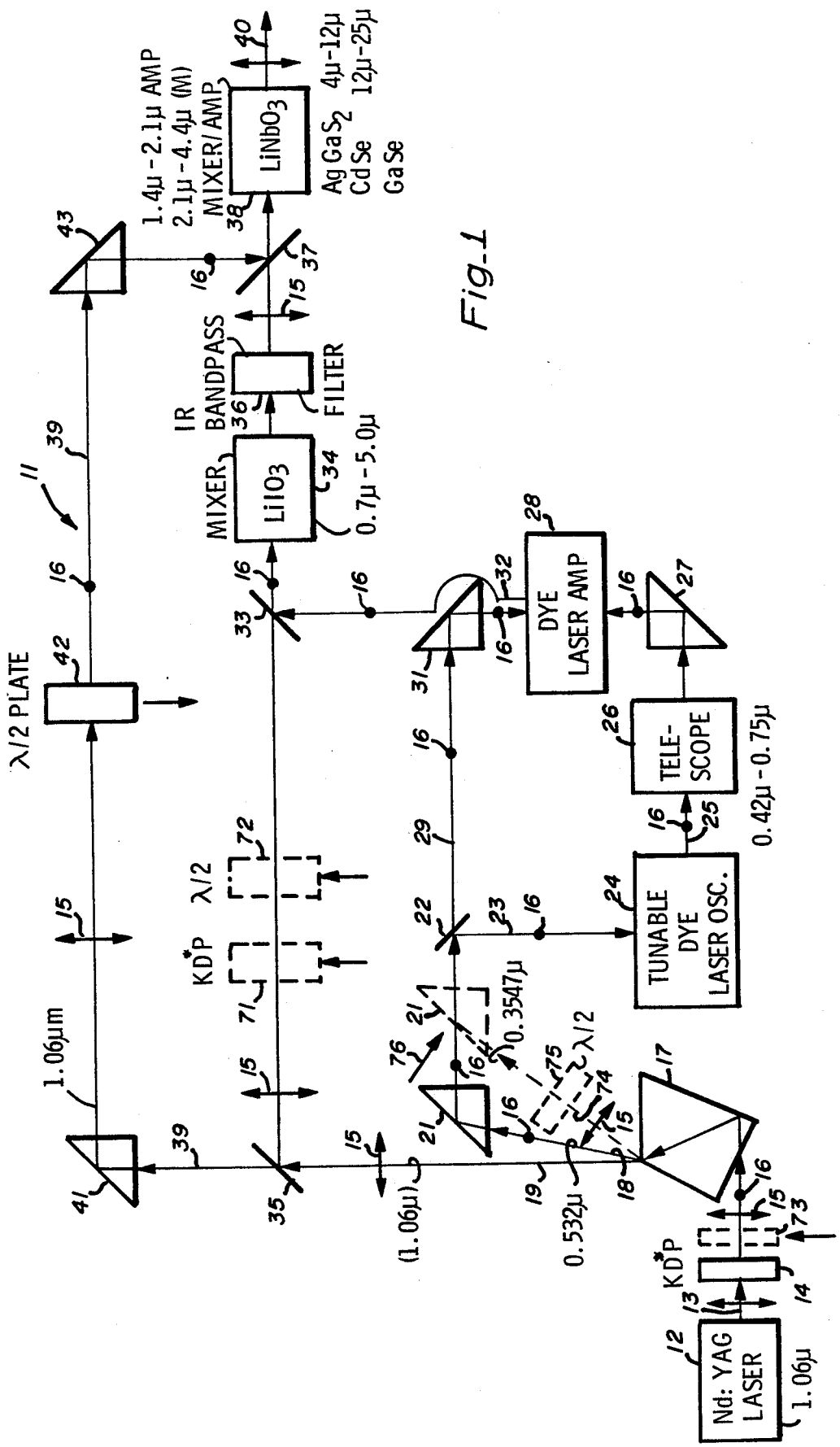
FIG. 1 is a diagram, partly in block diagram form, of an infrared source incorporating features of the invention.

Referring now to FIG. 1, there is shown a tunable wideband coherent infrared source 11 incorporating features of the present invention. The source includes a neodymium YAG laser pump 12 for producing a high power pulsed output beam of coherent infrared radiation of a fixed wavelength at 1.06 microns. The output beam 13 of the pump laser source 12 is horizontally polarized by means of a polarizer contained within the laser 12. The output beam of the laser at 1.06 microns is fed into a KD*P harmonic generator 14 for converting a portion of the output beam 13 into pumping radiation at a wavelength of 0.532 microns in the green band. The harmonic generator 14 polarized the electric vector of the green output wave at right angles to the electric vector of the pump energy at 1.06 microns. The orthogonal polarization is as indicated by polarization arrows 15 and 16.

The output beam 13, having both 1.06 micron radiation and 0.532 micron radiation therein, is directed into a prism 17 for separating the 0.532 micron radiation, as output beam 18, from the 1.06 micron radiation passing through the prism as beam 19. The green output beam 18 is reflected from a prism 21 and thence from a beam splitting mirror 22 along beam path 23 transversely into the dye cell of a tunable dye laser oscillator 24 for transversely pumping the dye laser gain medium thereof. The output of the tunable dye laser oscillator (See Table I, below) is output beam 25 having a vertical polarization and being mechanically tunable from 0.57 microns to 0.75 microns by turning a grating.

The output beam 25 from the tunable dye laser oscillator 24 is thence beam expanded from a diameter of approximately 1.5 millimeter to a diameter of approximately 6 millimeters via a telescope 26 and thence directed via a reflecting prism 27 into the input port of a longitudinally pumped dye laser amplifier 28. A typical longitudinally pumped dye laser amplifier cell 28 is of the type disclosed in an article appearing in Optics Communications Vol II, number 1 of May 1974 pages 14–17.

The pump input to the dye laser amplifier 28 is derived from the transmitted output of the beam splitting mirror 22, as beam 29, which is thence directed from a reflecting prism 31 through the output port of the dye laser amplifier 28 generally coaxially of the input beam 16 passing through a suitable input window or port.

The amplified output beam 32 is directed out of the dye laser amplifier cell and over the top or underneath the reflecting prism 31 to a beam combiner 33 and thence into a nonlinear crystal mixer 34 as of $LiIO_3$ or $LiNbO_3$. A suitable mixer crystal 34 is described in the aforecited Optics Communications article of January 1976. The Z axis of the mixer crystal 34 is oriented paralled to the polarization of the pump wave energy which is the input wave of shortest wavelength. The output wave from the mixer 34 is polarized perpendicular to the polarization of the pump wave. In the mixer 34, the vertically polarized amplifier output light derived from the tunable dye laser oscillator 24 is mixed with the horizontally polarized laser energy at 1.06 microns derived from laser beam 19 via beam splitting mirror 35 and beam combiner 33. The tunable dye laser oscillator output operates as the pump energy and is difference mixed in mixer 34 with the laser energy at 1.06 microns to derive a tunable output in response to the tuning of the dye laser 24 which is tunable from 1.23 microns to 2.5 microns for $LiIO_3$ (See Table I, below).

The horizontally polarized output of the mixer 34 is fed through an infrared bandpass filter 36 for removing the visible energy and thence directed through a dicroic beam combiner 37 into the input of a second crystal mixer/amplifier 38 for mixing or amplification, as the case may be, to derive an output wave 40 which is tunable from 1.23 microns to 2.54 microns as an amplifier and from 4.41 microns to 7.98 microns as a mixer. In the second nonlinear crystal stage 38, the output of the first mixing stage 34 is combined with laser energy at 1.06 microns, as derived from the output of the beam splitting mirror 35, as beam 39. Beam 39 is reflected for prism 41 through a half wave plate 42 for shifting the polarization of the laser wave energy at 1.06 microns from horizontal to vertical and thence directed via a reflecting prism 43 onto beam combiner 37, and thence into the second nonlinear crystal mixer amplifier stage 38. The same rules regarding polarization of the pump wave, orientation of the Z axis of the crystal 38, and output polarization apply to crystal mixer/amplifier 38 as did to the first crystal mixer 34. Thus, the laser beam input into crystal 38 functions as the pump wave and thus the output wave energy 40 from 1.23 microns to 2.54 and from 4.41 microns to 7.98 microns is horizontally polarized, and the Z axis of the crystal over this range is parallel to the pump wave, i.e., vertical.

In the output wavelength range from 1.23 microns to 2.54 microns, the mixer/amplifier crystal 38 preferably comprises a crystal of the $LiNbO_3$ which is operated as an amplifier in the 1.23 micron to 2.54 micron range of 1.23 microns to 1.42 microns. From 4.41 microns to 7.98 microns, the $LiNbO_3$ crystal 38 is replaced by a silver thiogallate crystal ($AgGaS_2$) which provides, in the difference mixing mode, an output from 4.41 microns to 7.98 microns in response to a tunable input derived from the first mixer stage tunable over the range of 1.23 microns to 1.42 microns.

Referring now to FIG. 2, there is shown a tunable wideband coherent infrared source 51 comprising an alternative embodiment of the present invention. In this embodiment, the same elements as utilized in the embodiment of FIG. 1 are designated by the same numerals. The output of the Nd:YAG laser 12 at 1.06 microns is fed through the second harmonic generator 14 to produce vertically polarized coherent output radiation at the wavelength of 0.532 microns. A first dichroic beam splitter mirror 52 having a high transparency, i.e., greater than 90 percent for the 1.06 micron radiation and a 15 percent reflectivity for the second harmonic radiation, directs a first beam 23 of second harmonic radiation transversely into the dye cell of the tunable dye laser oscillator 24. The beam 23 is focused by means of an 8 centimeter focal length cylindrical lens 53 into the dye cell of the tunable dye laser oscillator 24.

The output of the dye laser oscillator 24, namely, beam 25 comprises a vertically polarized beam of radiation tunable over a relatively wide band from 0.57 to 0.750 microns depending upon the type of dye utilized in the dye laser. See the Dye Laser Table I, below, for tuning ranges and corresponding dyes. The output beam is collimated by means of a 15 centimeter focal length cylindrical lens 54 into a dye preamplifier cell 55 for transverse pumping by means of a second beam 50 of second harmonic radiation at 0.53 microns derived from the output of the first beam splitting mirror 52 and directed by a second beam splitting mirror 56 through an 8 centimeter focal length cylindrical lens 57 into the dye preamplifier cell 55.

The output beam of the dye preamplifier cell 55 is directed by means of a telescope 26, having a pair of lenses with focal lengths of minus 3 centimeters and plus 12 centimeters, respectively, into the dye amplifier cell 28 via the reflecting mirror 57. The second beam splitting mirror 56 has a 15 percent reflectivity for 0.53 micron radiation and a high transmission for the 1.06 micron radiation. The reflected output of beam splitting mirror 58 at 0.53 microns serves as the pump beam 29 for longitudinally pumping the dye amplifier cell 28.

The output beam 32 of the dye amplifier cell 28 is reflected from a totally reflecting mirror 59 onto a beam combiner 61, having a high reflectivity for the dye laser oscillator radiation and a high transmission for the 1.06 micron radiation. The 1.06 microns output of the third beam splitting mirror 58 is directed onto a fourth beam splitting mirror 62 which has a reflectivity of approximately 10 percent for the 1.06 micron radiation for diverting approximately 20 millijoules of 1.06 micron radiation through the beam combiner 61 into the first mixer crystal 34 when it is mixed with approximately 15 millijoules of dye laser oscillator radiation to produce horizontally polarized output radiation tunable in response to tuning of the dye laser oscillator from 1.23 microns to approximately 2.54 microns. Various tuning output wavelengths of the first mixer stage 34, as correlated with the respective dye, are shown in the aforecited Dye Laser Table I.

The output of the first mixer stage 34 is approximately 0.5 millijoules at 5ns and passes through the visible block filter 36 and thence through a dichroic beam combiner 37 into the mixer/amplifier 38. Beam combiner 37 has a high transmission for the output beam of the first mixer stage 34 and a high reflectivity for 1.06 micron laser radiation directed onto the mirror 37 and thence into the second crystal mixer 38. The laser radiation at 1.06 microns serves as the pump wave and is derived from the output of the beam splitting mirror 62 which is directed against a high reflectivity mirror 64, as beam 39, and thence passes through a half wave plate 42 for shifting the polarization to vertical and thence reflected from a high reflectivity mirror 65 onto the beam combiner 37. Pump beam 39 is directed colinearly with the output beam of the first mixer 34 into the second amplifier/mixing stage 38. Beam 39 has an energy of approximately 200 millijoules at 1.06 microns.

The output of the second crystal mixer 38 is tunable from 1.23 microns to 2.54 microns utilizing the various dyes of Table I and LiNbO$_3$ as an amplifier, see Table II. The output 40 is tunable from 2.54 microns to 4.4 microns using a LiNbO$_3$ crystal 38 in the difference mixing mode. The output 40 is tunable from 4.4 to 7.98 microns using AgGaS$_2$ as crystal 38 and operating in the difference mixing mode. The output pulses are of approximately 50 microjoules energy which corresponds to a peak power of approximately 10 kilowatts for 5 nanosecond pulse widths.

Referring again to FIG. 1, the tunable wideband coherent infrared source 11, as thus far described, used the output of the dye laser amplifier 28 as the pumping wave in the LiIO$_3$ crystal 34 mixer stage. In an alternative embodimemt, LiIO$_3$ crystal 34 is pumped by means of a second harmonic wave, at 0.532 micron, derived from the output of the laser 12. More particularly, the apparatus is substantially the same as previously described with regard to FIG. 1 with the exception that a KD*P crystal doubler 71 is interposed in the beam path between beam splitting mirror 35 and the beam combiner 33, at the input to the mixer crystal 34. Because the polarization of the second harmonic output of the double 71 is shifted 90° relative to the polarization of the 1.06 micron input, it is necessary to provide a half-wave plate 72 for shifting the polarization of the 2nd harmonic pumping wave at 0.532 micron back to the horizontal polarization. Since the pump wave is now the 0.532 micron wave, the output of the mixer 34 has a polarization perpendicular to that of the pump wave, namely a vertical polarization. The difference mode output of the first mixer 34 is thus, in this embodiment, tunable from 1.83 microns to 5.02 microns (see Table I).

In the second nonlinear crystal stage 38, the pump wave must be orthogonally polarized relative to the output of the first mixer stage 34. Thus the half-wave plate 42, in the laser beam 39, is pivoted out of the beam so that the polarization remains horizontal along beam path 39 into the second crystal stage 38 for pumping the second crystal mixer 38. The output wave 40 is vertically polarized, i.e., has a polarization perpendicular to the pump wave.

In this embodiment, the second crystal stage 38 is utilized in the amplifier mode for amplifying the output of the first crystal stage from 1.83 to 4.4 microns. Above 4.4 microns, the non-linear crystal 38 is also used in the amplifier mode but is changed to a crystal of AgGaS$_2$ for amplifying the wave energy from 4.4 to 5.02 microns. In this second embodiment, of the wideband infrared source 11, the additional elements 71 and 72 are merely pivoted into the beam path, whereas the half-wave plate 42 is merely pivoted out of the beam path 39.

Referring again to FIG. 2 in the corresponding second alternative embodiment thereof, wherein the first crystal mixer 34 is pumped with the second harmonic of the output of the laser 12, namely with 0.532 micron wave energy, the apparatus remains essentially the same as that previously described with regard to FIG. 2 with the exception that the beam splitting mirror 62 has its reflectivity altered so that it is transmissive to the 1.06 micron wave energy and highly reflective for the 0.532 micron energy derived from the output of the doubler 14. In addition, a half-wave plate 71 is pivoted into the beam path between the beam splitting mirror 62 and the first crystal mixer 34 for shifting the polarization of the second harmonic wave energy to horizontal. In addition, the half-wave plate 42 in beam 39, is pivoted out of the beam 39. The output of the first crystal mixer 34, when pumped with the second harmonic of the laser 12 is vertically polarized and the output wave 40 of the second mixer stage 38 is similarly vertically polarized. Crystals 34 and 38, in this embodiment, are operated in the same mode to produce the same output wavelengths as that previously described with regard to the similar alternative embodiment of FIG. 1.

Referring again to FIG. 1, as thus far described, an output wave is obtained which is tunable from 1.4 to 7.98 microns. However, to obtain longer output wavelengths, a third alternative embodiment of the wideband source 11 of FIG. 1 is employed. In this third embodiment, the tunable dye laser 24 and dye laser amplifier 28 are pumped with UV radiation, corresponding to the third harmonic, i.e., 0.3547 micron wavelength, of the laser output wave at 1.06 microns. In this embodiment of FIG. 1 a second KD*P type II summer crystal 73 is inserted after the doubler crystal 14. This causes the third harmonic output to be polarized parallel to the longest input wavelength, namely to be horizontally polarized. The third harmonic output energy is then refracted from the prism 17, as output beam 74, and a half-wave plate 75 is rotated into the beam 74 to shift the polarization of the horizontally polarized 3rd harmonic pumping wave energy to vertical polarization. The reflecting prism 21 is moved as indicated by the arrow 76 to intercept the 3rd harmonic pumping beam 74 and to reflect the beam over the aforedescribed beam paths 23 and 29 into the tunable dye laser oscillator 24 and dye laser amplifier 28 respectively. UV (ultra violet) pumping wave energy is thus utilized for synchronously pumping dyes Nos. 1–6 of Table 1 to produce tunable dye laser output wave energy, tunable from 0.420 micron to 0.580 micron. This output is amplified in the dye laser amplifier 28 and directed into the first crystal mixer 34, wherein it is mixed with the output of the laser at 1.06 microns derived from the beam splitting mirror 35. The output of the first mixer stage 34, as pumped with the output of the dye laser amplifier 28, is tunable from 0.694 micron to 1.27 microns. This output is then fed through the filter 36, beam combiner 37, and mixed in the second crystal mixer 38 with 1.06 micron energy derived from the laser 12 via beam path 39.

In the second crystal mixer 38, the shortest wavelength of wave energy supplied thereto is the pump wave and the output polarization relative to the polarization of the pump wave is dependent on the particular crystal used. Since the dye laser output is always the pump wave in the first mixer stage 34, the output of the first mixer stage is always horizontally polarized. However, in the second mixer stage there is a cross-over when the output of the first mixer stage 34 reaches a wavelength of 1.06 microns. When the output of the first mixer stage 34 is of a shorter wavelength than 1.06 microns, the output of the first mixer stage 34 is the pump wave and the output 40 will thus be vertically polarized. However, when the output of the first mixer stage 34 has a wavelength greater than 1.06 microns then the 1.06 micron wave derived via beam path 39, becomes the pump wave and the output 40 becomes horizontally polarized.

In the output wavelengths from 1.4 to 4.4 microns, the second crystal 38 preferably comprises $LiNbO_3$. In the range from 4.4 to 12 microns, the second crystal 38 preferably comprises $AgGaS_2$. In the range from 9 microns to 18 microns, the second crystal 38 is preferably GaSe and from 12 microns to 25 microns, the second crystal is CdSe.

As in all the previous embodiments, the direction of the Z axis of the crystal 34 or 38 relative to the polarization of the pump wave is dependent on the particular crystal used. Utilizing the UV pumped dyes numbers 1-6, an output wave 40 is obtainable which is tunable from 1.996 microns to 25 microns and from 70 microns and longer. The preferred embodiment utilizes dye No. 6 tunable from 1.43 microns to D.C. and uses the second harmonic pumped dyes to obtain output 40 for wavelengths shorter than 6.43 microns.

Referring now to FIG. 2 and utilizing the UV pumped dyes, the KD*P crystal tripler 73 of the type II summer kind is pivoted into the output beam derived from the doubler 14 to produce horizontally polarized UV pump energy at the output of the tripler 73. The beam splitting mirrors 52, 56, and 58 have their reflectivities arranged such that the UV energy is successively reflected from these beam splitting mirrors into the dye laser oscillator 24, dye preamplifier 55, and dye amplifier 28 respectively, via the intermediary of half-wave plates 75 located in each of the respective beam paths 23, 50 and 29 for shifting the polarization of the pump wave from horizontal to vertical. The beam splitting mirror 62 is the same as in the first embodiment of the source of FIG. 2, for directing a portion of the 1.06 micron wave into the first crystal stage 34 and a second portion of the 1.06 micron wave into the second crystal mixer 38. The crystals 34 and 38 dyes are selected, for this embodiment, in the same manner as described above with regard to the similar embodiment of FIG. 1.

In a typical example of the coherent tunable wideband infrared source 11, the pumping source 12 comprises a Nd:YAG laser commercially available from Quanta-Ray, Inc. of Mountain View, California. The tunable dye laser 24 is of the transversely pumped type such as that disclosed in U.S. Pat. No. 4,016,504 and commercially available from Molectron Corporation of Sunnyvale, California. Suitable dyes for use in the dye laser oscillator 24 include Rhodamine 6G, Rhodamine B, Cresyl violet perchlorate, and carbazine 122 in alcohol or water. Such dyes are commercially available from Exciton Co. Inc, of Dayton, Ohio. Also, suitable dye laser gain media are disclosed in the aforecited Optics Communications article of January 1976. Suitable $LiIO_3$ crystal mixer configurations are disclosed in the aforecited Optics Communications article. Crystal mixers of lithium niobate are disclosed in Applied Physics Letters, Vol. 25, No. 9, of Nov. 1, 1974 page 520 et seq. and are commercially available from Crystal Technology of Mountain View, California. Crystal mixers of $AgGaS_2$ are disclosed in Optics Communications, Vol. 8, No. 2 of June 1973 page 151–153. Crystal mixers of GaSe are disclosed in Sov. J. of Quantum Electronics, Vol. 6, No. 1, January 1976 page 88–90, and CdSe crystal mixers are disclosed in the aforecited Applied Physics Letters' article of 1974 pages 527–530, and are commercially available from Cleveland Crystal Inc. of Cleveland, Ohio.

The advantage of the tunable wideband coherent source of the present invention is that it provides a practical tunable source of coherent radiation over the band of 1.4 microns to 25 microns and has improved reliability when contrasted with the prior art source employing a parametric oscillator followed by a mixer. In addition, the use of a second nonlinear crystal stage 38 pumped with the relatively high power of the laser pump wave at 1.06 microns, as derived from the laser 12, permits the power of the output wave 40 to be greater than the output power of the dye laser 24 and/or greater than the output power of the first crystal mixer. Thus substantial output power is obtainable.

TABLE I

| | Dye | Dye Laser Tuning Range μ | DYE LASER $LiIO_3$ 1st Mixer Range μ Dye-1.06μ | $LiIO_3$ 0.532 μ-Dye | 2nd Mixer Range (or amplifier) μ |
| --- | --- | --- | --- | --- | --- |
| 1. | Coumarin 440 | 0.420–0.460 | 0.694–0.810 | | 1.99–3.40 |
| 2. | Coumarin 460 | 0.440–0480 | 0.750–0.874 | | 2.54–4.89 |
| 3. | Coumarin 481 | 0.460–0520 | 0.810–1.02 | | 3.40–23 |
| 4. | Coumarin 500 | 0.475–0545 | 0.858–1.12 | | 4.43-DC–22 |
| 5. | Coumarin 485 | 0.490–0.560 | 0.908–1.18 | | 6.21-DC–10.6 |
| 6. | Coumarin 540A | 0.515–0.580 | 0.998–1.27 | | 16.1-DC–6.43 |
| 7. | Rhodamine 590 | 0.570–0.605 | 1.23–1.42 | | 7.98–4.41 |
| 8. | Rhodamine 610 | 0.595–0.640 | 1.35–1.61 | 5.02–3.15 | 5.02–3.15 |
| 9. | Rhodamine 640 | 0.620–0.680 | 1.49–1.88 | 3.75–2.44 | 3.75–2.44 |
| 10. | R590 + CV670 | 0.640–0.685 | 1.61–1.92 | 3.15–2.38 | 3.15–2.38 |
| 11. | R610 + NB690 | 0.680–0.710 | 1.88–2.13 | 2.44–2.12 | 2.44–2.12 |
| 12. | R610 + DX725 | 0.705–0.750 | 2.09–2.54 | 2.17–1.83 | 2.17–1.83 |

TABLE II

| | 2nd STAGE CRYSTAL | |
|---|---|---|
| CRYSTAL 38 | DYE* | OUTPUT MICRONS |
| LiNbO$_3$ as amplifier | Dye #8-12 | 1.4 microns-2.54 microns |
| LiNbO$_3$ as 2nd mixer | Dye #8,9 | 2.54 microns-4.4 microns |
| AgGaS$_2$ as 2nd mixer | Dye #8,7,6 | 4.4 microns-12 microns |
| GaSe as 2nd mixer | Dye #6 | 9 microns-18 microns |
| CdSe as 2nd mixer | Dye #6 | 12 microns-25 microns |

*From Table 1

What is claimed is:

1. In a tunable wideband infrared source:
   first laser means for generating first output optical radiation at a first wavelength;
   multiplier means responsive to said first output optical radiation for generating second coherent output radiation at a second wavelength which is shorter than said first wavelength;
   dye laser means responsive to said second output coherent optical radiation for producing third output coherent optical radiation which is continuously tunable over a band of third wavelengths;
   first crystal mixer means responsive to said first output radiation at said first wavelength or harmonics thereof and to said third output optical radiation for producing fourth output optical radiation which is responsive to the tuning of said third output radiation for tuning over a band of fourth wavelengths; and
   second crystal mixer means responsive to said first output radiation and to said fourth output optical radiation for producing fifth output optical radiation which is responsive to the tuning of said fourth output radiation for tuning over a band of fifth wavelengths in the infrared band.

2. The apparatus of claim 1 wherein said multiplier means comprises a frequency doubler for the frequency of the first output radiation such that said second wavelength is one-half of said first wavelength.

3. The apparatus of claim 1 wherein said first crystal mixer means comprises a LiIO$_3$ crystal mixer.

4. The apparatus of claim 1 wherein said second crystal mixer is selected from the group consisting of LiNbO$_3$, AgGaS$_2$, CdSe, and GaSe.

5. The apparatus of claim 1 wherein said first laser means comprises a Nd:YAG laser.

6. The apparatus of claim 1 wherein said dye laser means includes a dye laser gain medium responsive to said second output radiation at said second wavelength and selected from the group consisting of coumarin, Rhodamine, Cresyl violet, and Oxazine.

7. The apparatus of claim 1 wherein said multiplier means comprises a frequency tripler for tripling the frequency of the first output radiation such that said second wavelength is one third of said first wavelength.

* * * * *